United States Patent
Davidson

(10) Patent No.: US 11,146,043 B2
(45) Date of Patent: Oct. 12, 2021

(54) SWITCHING APPARATUS

(71) Applicant: General Electric Technology GmbH, Baden (CH)

(72) Inventor: Colin Charnock Davidson, Stafford (GB)

(73) Assignee: General Electric Technology GmbH, Baden (CH)

( * ) Notice: Subject to any disclaimer, the term of this patent is extended or adjusted under 35 U.S.C. 154(b) by 24 days.

(21) Appl. No.: 16/469,917

(22) PCT Filed: Dec. 11, 2017

(86) PCT No.: PCT/EP2017/082132
§ 371 (c)(1),
(2) Date: Jun. 14, 2019

(87) PCT Pub. No.: WO2018/108769
PCT Pub. Date: Jun. 21, 2018

(65) Prior Publication Data
US 2020/0083675 A1    Mar. 12, 2020

(30) Foreign Application Priority Data
Dec. 15, 2016    (EP) .................................. 16204366

(51) Int. Cl.
*H02B 1/24* (2006.01)
*H01H 33/02* (2006.01)
(Continued)

(52) U.S. Cl.
CPC ............. *H02B 1/24* (2013.01); *H01H 33/027* (2013.01); *H01H 33/596* (2013.01); *H01H 33/64* (2013.01)

(58) Field of Classification Search
None
See application file for complete search history.

(56) References Cited

U.S. PATENT DOCUMENTS 2,947,910 A * 8/1960 Shepard, Jr. ........... G01R 13/28
  315/163
2,947,913 A * 8/1960 Trostler .................. H01J 17/40
  315/238
(Continued)

FOREIGN PATENT DOCUMENTS

| EP | 2985775 A1 | 2/2016 |
| FR | 875 595 A | 9/1942 |
| WO | 2014142974 A1 | 9/2014 |

OTHER PUBLICATIONS

International Search Report and Written Opinion, PCT/EP2017/082132, dated Dec. 15, 2016 (12 pp.).

*Primary Examiner* — Lincoln D Donovan
*Assistant Examiner* — Khareem E Almo
(74) *Attorney, Agent, or Firm* — Eversheds Sutherland (US) LLP

(57) ABSTRACT

A switching apparatus comprises: a plurality of parallel-connected current-conductive branches, each current-conductive branch including at least one respective gas tube switch; and a switching control unit configured to control the turn-on of the gas tube switches in a switching order so that the flow of current in the switching apparatus is controlled to switch between the current-conductive branches, wherein the switching order of the turn-on of the gas tube switches is arranged so that only one of the current-conductive branches is carrying the current during each turn-on cycle of the switching apparatus.

13 Claims, 4 Drawing Sheets

(51) Int. Cl.
*H01H 33/59* (2006.01)
*H01H 33/64* (2006.01)

(56) References Cited

U.S. PATENT DOCUMENTS

| | | | | |
|---|---|---|---|---|
| 2,960,623 | A * | 11/1960 | Helmut | H03K 23/82 |
| | | | | 377/103 |
| 4,174,944 | A * | 11/1979 | Newell | F21K 5/02 |
| | | | | 431/359 |
| 9,520,801 | B1 * | 12/2016 | She | H02M 7/213 |
| 9,973,092 | B2 * | 5/2018 | She | H02M 3/33 |
| 2010/0133914 | A1 | 6/2010 | Kang et al. | |
| 2017/0047857 | A1 * | 2/2017 | She | H02J 3/36 |
| 2017/0310220 | A1 * | 10/2017 | She | H02M 3/33584 |
| 2020/0153424 | A1 * | 5/2020 | Davidson | H03K 17/26 |
| 2020/0177096 | A1 * | 6/2020 | Ginnareddy | H02M 7/5387 |

* cited by examiner

SWITCHING APPARATUS

RELATED APPLICATIONS

This application claims priority to International Patent Application Serial No. PCT/EP2017/082132, titled "Switching Apparatus", filed Dec. 11, 2017, which claims priority to Europe Application Serial No. 16204366.5, titled "Switching Apparatus", filed Dec. 15, 2016, the contents of which are both incorporated herein by reference.

This invention relates to a switching apparatus and to a method of operating a switching apparatus, preferably for use in high voltage direct current (HVDC) applications.

It is known to use a switching apparatus that comprises a plurality of switches connected in parallel.

According to a first aspect of the invention, there is provided a switching apparatus comprising: a plurality of parallel-connected current-conductive branches, each current-conductive branch including at least one respective gas tube switch; and a switching control unit configured to control the turn-on of the gas tube switches in a switching order so that the flow of current in the switching apparatus is controlled to switch between the current-conductive branches, wherein the switching order of the turn-on of the gas tube switches is arranged so that only one of the current-conductive branches is carrying the current during each turn-on cycle of the switching apparatus.

It will be understood that, in the switching apparatus of the invention, each current-conductive branch may include a single gas tube switch or a plurality of gas tube switches (e.g. a plurality of series-connected gas tube switches).

The parallel connection of the current-conductive branches in the switching apparatus of the invention improves the reliability of the "gas tube switch"-based switching apparatus by providing a plurality of gas tube switches in place of a single gas tube switch.

In addition turning on the gas tube switches in the switching order according to the invention to prevent simultaneous flow in multiple current-conductive branches during each turn-on cycle of the switching apparatus is advantageous for the following reasons.

In a conventional switching apparatus based on parallel-connected power semiconductor switches, turning on each power semiconductor switch one at a time results in higher losses than simultaneously turning on all of the power semiconductor switches. Thus, in order to reduce losses, it is desirable to employ the latter switching approach of simultaneously turning on all of the power semiconductor switches.

Furthermore turning on each power semiconductor switch one at a time increases the temperature ripple and peak temperature of the power semiconductor switches than turning on all of the power semiconductor switches at the same time. FIG. 1 illustrates the variation in temperature ripple and peak temperature when parallel-connected power semiconductor switches are turned on one at a time (as indicated by the graph line 20), and the variation in temperature ripple and peak temperature when the same parallel-connected power semiconductor switches are turned on all at the same time (as indicated by the graph line 22). For power semiconductor switches such as IGBTs, neither higher peak temperatures nor higher temperature ripples would be acceptable because power semiconductor switches are built into chips that are small and are connected by fragile wire bonds which fatigue easily when subjected to thermal cycling. This thereby provides another reason to control the parallel-connected power semiconductor switches to turn on all at the same time, rather than turn on one at a time.

On the other hand the inventor has found that, as a result of the negative slope resistances of gas tube switches, turning on a plurality of parallel-connected gas tube switches one at a time results in lower losses than simultaneously turning on all of the gas tube switches. Thus, in order to reduce losses, it is desirable to employ the former switching approach of turning on the parallel-connected gas tube switches one at a time, which is counterintuitive in view of the known reduction of losses accomplished by the conventional switching approach of simultaneously turning on all of the parallel-connected power semiconductor switches.

Although turning on a plurality of parallel-connected gas tube switches one at a time increases the temperature ripple and peak temperature of the gas tube switches when compared to turning on all of the gas tube switches at the same time, the configuration of gas tube switches (e.g. their relatively large, metallic cathodes) enables them to easily withstand such temperature conditions. Hence, the resulting increases in temperature ripple and peak temperature of the gas tube switches are not deterrents in employing the switching approach of turning on the parallel-connected gas tube switches one at a time.

Also, configuring the switching control unit to simultaneously turn on the gas tube switches to provide simultaneous flow of current in the current-conductive branches would normally require the sharing of current between the parallel-connected current-conductive branches in order to provide a reliable switching apparatus.

In a conventional switching apparatus based on parallel-connected power semiconductor switches, the positive slope resistances of the power semiconductor switches are such that current sharing between the parallel-connected power semiconductor switches occurs naturally to a degree, especially if the temperature coefficient is positive. FIG. 2 illustrates the stable current sharing between parallel-connected power semiconductor switches (which are referred to as Device 1 and Device 2 respectively), where there is a stable crossover point between their voltage-current characteristics. In addition, for certain types of power semiconductor switches, gate control can be employed to control the states of the parallel-connected power semiconductor switches in order to rebalance the currents flowing through the parallel-connected power semiconductor switches.

On the other hand, in a switching apparatus based on parallel-connected gas tube switches, it is not possible to obtain stable sharing of current between the parallel-connected gas tube switches. This is because, as shown in FIG. 3 which illustrates the unstable current sharing between parallel-connected gas tube switches, the stable operating points are when all of the current flows through one of the gas tube switches but zero current flows through the other gas tube switch. This is because the negative slope resistances of the gas tube switches are such that there is a tendency of the current to flow through only one or the other of the gas tube switches on either side of the unstable crossover point between their voltage-current characteristics. Moreover it would not be possible to rebalance the currents flowing through the parallel-connected gas tube switches through switching control due to the fact that gas tube switches only have fully-on and fully-off states.

The configuration of the switching control unit to turn on the gas tube switches in a switching order according to the invention therefore results in a reliable "gas tube switch"-based switching apparatus with reduced losses, while at the same time obviates the requirement to control the sharing of current between the parallel-connected current-conductive branches.

In embodiments of the invention, the switching order may be any one of:
  a fixed switching order;
  a fixed sequential switching order;
  a variable switching order;
  a random switching order;
  a quasi-random switching order.

A fixed switching order, a fixed sequential switching order, or a random switching order of the turn-on of the gas tube switches may be preferred when the states of the gas tube switches are unchanging or stay inside a predefined range within tolerance limits or when any changes in the states of the gas tube switches are predictable.

A variable or quasi-random switching order of the turn-on of the gas tube switches may be preferred if the switching control unit is required to be responsive to changes in the states of the gas tube switches, in particular unpredictable changes in the states of the gas tube switches.

Non-limiting examples of the configuration of the switching control unit to be responsive to changes in the states of the gas tube switches is described in the following embodiments.

In one such embodiment of the invention, the switching apparatus may further include a monitoring unit configured to monitor a respective parameter indicative of a respective state of each gas tube switch, wherein the switching control unit may be configured to arrange the switching order of the turn-on of the gas tube switches in response to a deviation of at least one monitored parameter from a target value or range. The state of each gas tube switch may include, but is not limited to, its health, its ability to operate within safety limits, its switching performance, or a combination thereof. The monitored parameter may be, but is not limited to: a temperature of the gas tube switch, in particular a cathode temperature of the gas tube switch; or a condition of the plasma of ionized gas inside the gas tube switch, which can be monitored using for example a spectroscopic analyser.

The switching control unit may be configured to arrange the switching order of the turn-on of the gas tube switches to adjust a duty cycle of at least one gas tube switch in the switching order in response to a deviation of the or each corresponding monitored parameter from a target value or range. This allows the switching control unit to arrange the switching order so as to compensate for the deviation of the or each corresponding monitored parameter from the target value or range.

The target value may be the mean value of the respective parameters of the gas tube switches. The target range may extend between predefined tolerance limits of the mean value of the respective parameters of the gas tube switches.

The switching control unit may be configured to arrange the switching order of the turn-on of the gas tube switches so that, when the deviation of the at least one monitored parameter from the target value or range exceeds a predefined threshold, the turn-on of the or each corresponding gas tube switch is excluded from the switching order. Such a configuration of the switching control unit can be used to not only maintain the health of the gas tube switches, but also ensure that the gas tube switches are operating within safety limits.

In further embodiments of the invention, the switching apparatus may further include a detection unit configured to detect whether each gas tube switch has failed, wherein the switching control unit may be configured to control the turn-on of the gas tube switches in the switching order so that, in response to the detection of a failure of a given gas tube switch that was commanded to turn on by the switching control unit, the switching control unit commands the next gas tube switch in the switching order to turn on.

Configuring the switching apparatus in this manner ensures that the switching apparatus is capable of continuing its operation in the event of the failure of the given gas tube switch. Otherwise the switching apparatus would simply halt its operation as soon as the failure of the given gas tube switch occurs.

In such embodiments of the invention, the switching control unit may be configured to control the turn-on of the gas tube switches in the switching order so that, in response to the detection of a failure of a given gas tube switch that was commanded to turn on by the switching control unit, the switching control unit commands the given gas tube switch to turn on when the given gas tube switch is required to be turned on again according to the switching order.

Since the failure of the given gas tube switch may be temporary, configuring the switching apparatus in this manner would allow the switching apparatus to revert to its normal switching operation, instead of skipping the next turn-on of the given gas tube switch in the switching order which could adversely affect the overall performance of the switching apparatus.

In the event of the permanent failure of the given gas tube switch, the switching control unit would then continue to command the next gas tube switch in the switching order to turn on after each time the switching control unit attempts to turn on the failed gas tube switch.

In embodiments of the invention, the detection unit may include a current detection sub-unit, wherein the current detection sub-unit includes at least one current sensor. Since gas tube switches are typically configured to fail to open circuit, a current sensor would be able to detect the failure of a gas tube switch from the lack of current flowing through the current-conductive path in which the failed gas tube switch is located, or from the lack of current flowing through the switching apparatus.

Optionally the current detection sub-unit may consist of a single current sensor to measure the current flowing through the switching apparatus. Since the gas tube switches are turned on in a switching order arranged so that only one of the current-conductive branches is carrying the current during each turn-on cycle of the switching apparatus, it would be straightforward to associate the lack of current flowing through the entire switching apparatus with the failure of a given gas tube switch commanded to turn on. Hence it may be preferable to rely on a single current sensor to detect the failure of a given gas tube switch that was commanded to turn on by the switching control unit, in order to reduce the number of current sensors in the switching apparatus.

In further embodiments of the invention, the detection unit may include a voltage detection sub-unit, wherein the voltage detection sub-unit includes at least one voltage sensor. The failure of a given gas tube switch can be detected using a voltage sensor that is configured to monitor the voltage across the given gas tube switch and check whether the voltage collapses to a low value (e.g. <500V) within a predefined time period (e.g. a few µs) after the turn-on command. If the voltage across the gas tube switch collapses within the predefined time period, the gas tube switch is successfully turned on. If the voltage across the gas tube switch does not collapse, the gas tube switch is detected as having failed.

It will be appreciated that the switching apparatus of the invention may be used in a wide range of switching applications.

In a preferred embodiment of the invention, the switching apparatus may be configured for use in a HVDC application. In such an embodiment, the switching apparatus may be configured to have a current rating suitable for a HVDC application.

According to a second aspect of the invention, there is provided a method of operating a switching apparatus, the switching apparatus comprising: a plurality of parallel-connected current-conductive branches, each current-conductive branch including at least one respective gas tube switch, wherein the method comprises the steps of: controlling the turn-on of the gas tube switches in a switching order so that the flow of current in the switching apparatus is controlled to switch between the current-conductive branches; and arranging the switching order of the turn-on of the gas tube switches so that only one of the current-conductive branches is carrying the current during each turn-on cycle of the switching apparatus.

In the method of the second aspect of the invention, the switching order may be any one of:
a fixed switching order;
a fixed sequential switching order;
a variable switching order;
a random switching order;
a quasi-random switching order.

The method of the second aspect of the invention may further include the steps of:
monitoring a respective parameter indicative of a respective state of each gas tube switch; and
arranging the switching order of the turn-on of the gas tube switches in response to a deviation of at least one monitored parameter from a target value or range.

The method of the second aspect of the invention may include the step of arranging the switching order of the turn-on of the gas tube switches to adjust a duty cycle of least one gas tube switch in the switching order in response to a deviation of the or each corresponding monitored parameter from a target value or range.

In the method of the second aspect of the invention, the target value may be the mean value of the respective parameters of the gas tube switches, or the target range may extend between predefined tolerance limits of the mean value of the respective parameters of the gas tube switches.

The method of the second aspect of the invention may include the step of arranging the switching order of the turn-on of the gas tube switches so that, when the deviation of the at least one monitored parameter from the target value or range exceeds a predefined threshold, the turn-on of the or each corresponding gas tube switch is excluded from the switching order.

The method of the second aspect of the invention may include the steps of:
commanding a given gas tube switch in the switching order to turn on;
detecting that the given gas tube switch has failed;
in response to the detection of the failure of the given gas tube switch, commanding the next gas tube switch in the switching order to turn on.

The method of the second aspect of the invention may further include the steps of:
commanding a given gas tube switch in the switching order to turn on;
detecting that the given gas tube switch has failed;
in response to the detection of the failure of the given gas tube switch, commanding the given gas tube switch to turn on when the given gas tube switch is required to be turned on again according to the switching order.

The method of the second aspect of the invention may include the step of using a detection unit to detect that the given gas tube switch has failed, wherein the detection unit includes: a current detection sub-unit including at least one current sensor; and/or a voltage detection sub-unit including at least one voltage sensor.

In the method of the second aspect of the invention, the current detection sub-unit may consist of a single current sensor to measure the current flowing through the switching apparatus so as to detect that the given gas tube switch has failed.

In the method of the second aspect of the invention, the switching apparatus may be configured to have a current rating suitable for a high voltage direct current application.

The advantages of the switching apparatus of the first aspect of the invention and its embodiments apply mutatis mutandis to the method of the second aspect of the invention and its embodiments.

A preferred embodiment of the invention will now be described, by way of a non-limiting example, with reference to the accompanying drawings in which.

The following embodiment of the invention is used primarily in HVDC applications, but it will be appreciated that the following embodiment of the invention is applicable mutatis mutandis to other switching applications.

Figure 1:
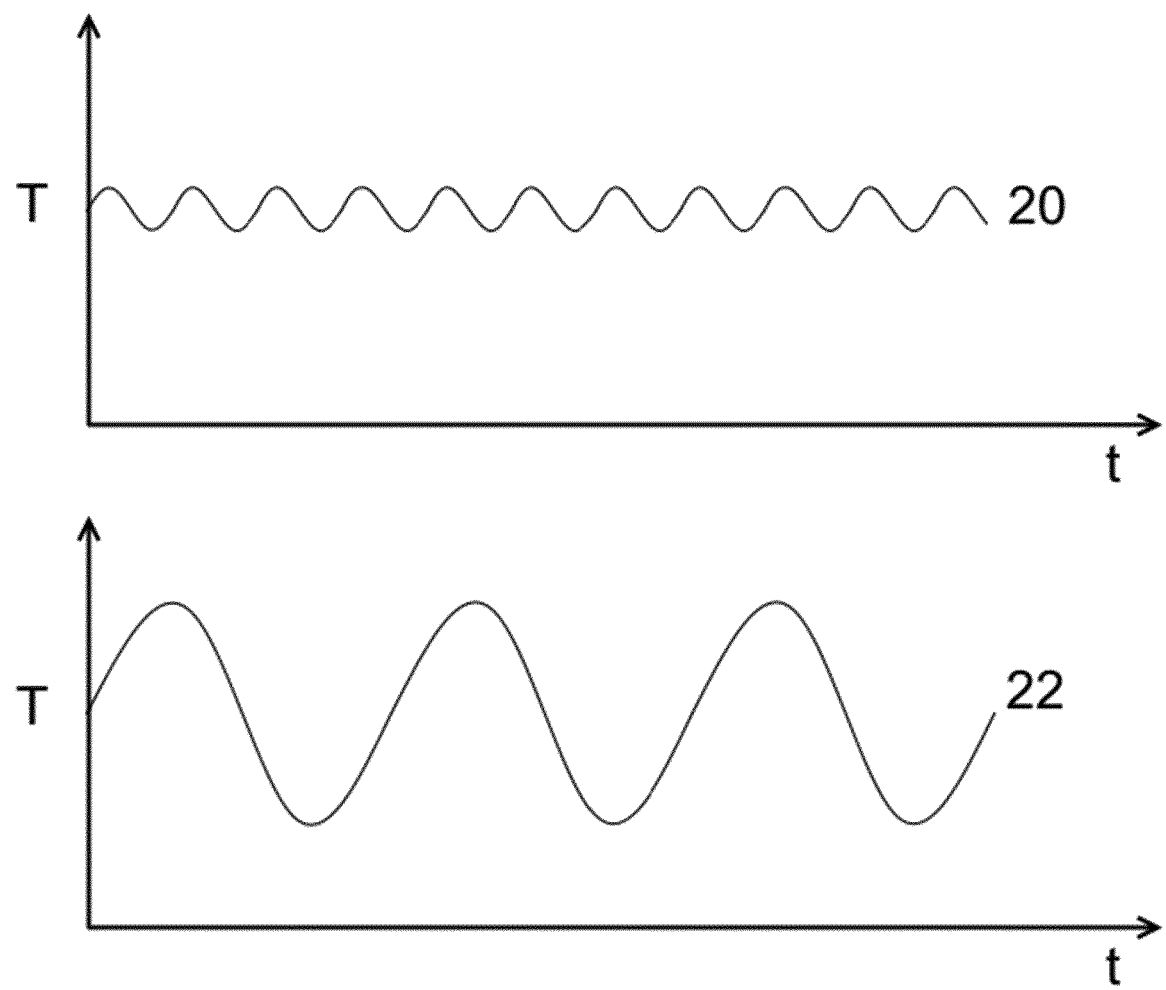
FIG. 1 illustrates the switching characteristics of parallel-connected power semiconductor switches.
Figure 2:
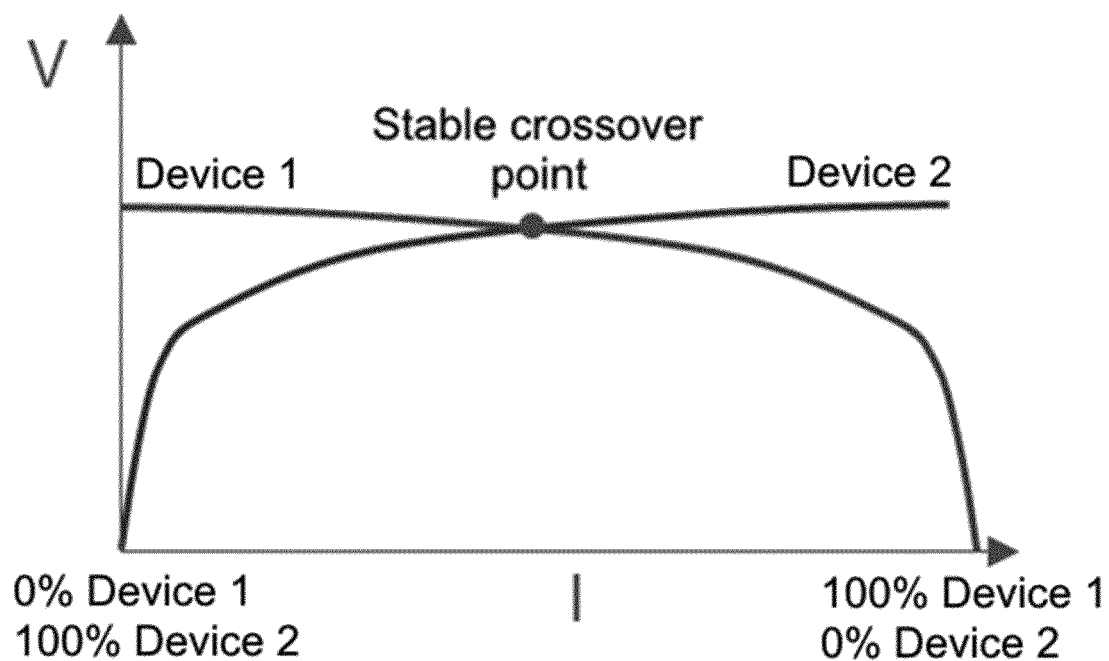
FIG. 2 illustrates the current sharing characteristics of parallel-connected semiconductor switches.
Figure 3:
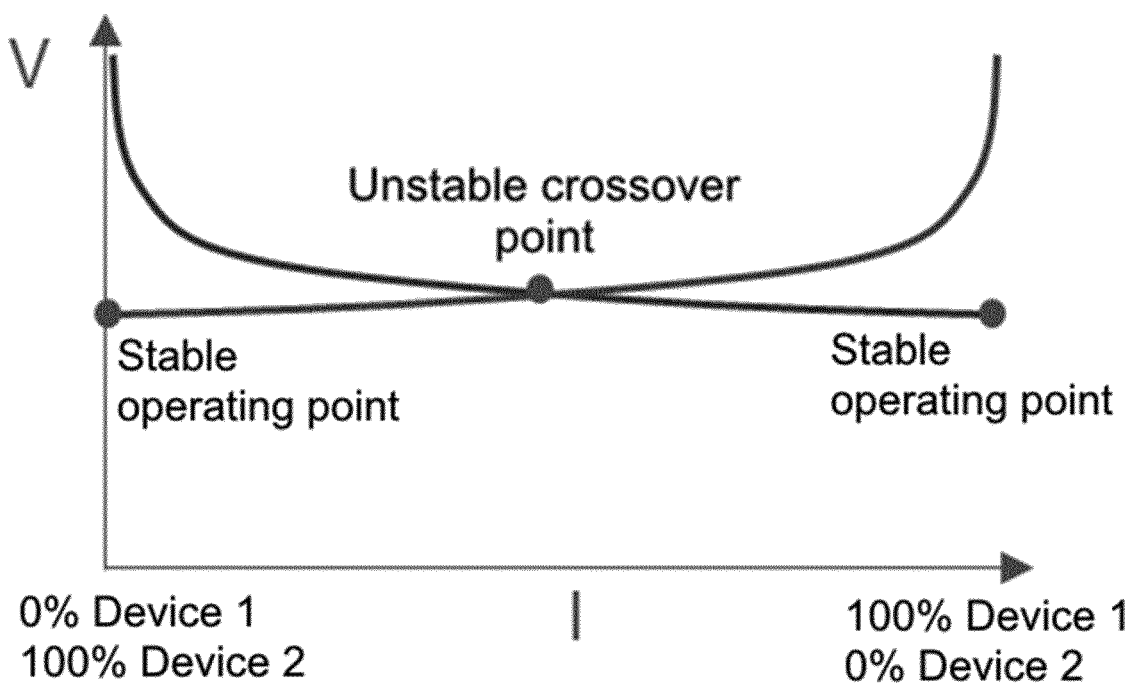
FIG. 3 illustrates the current sharing characteristics of parallel-connected gas tube switches.
Figure 4:
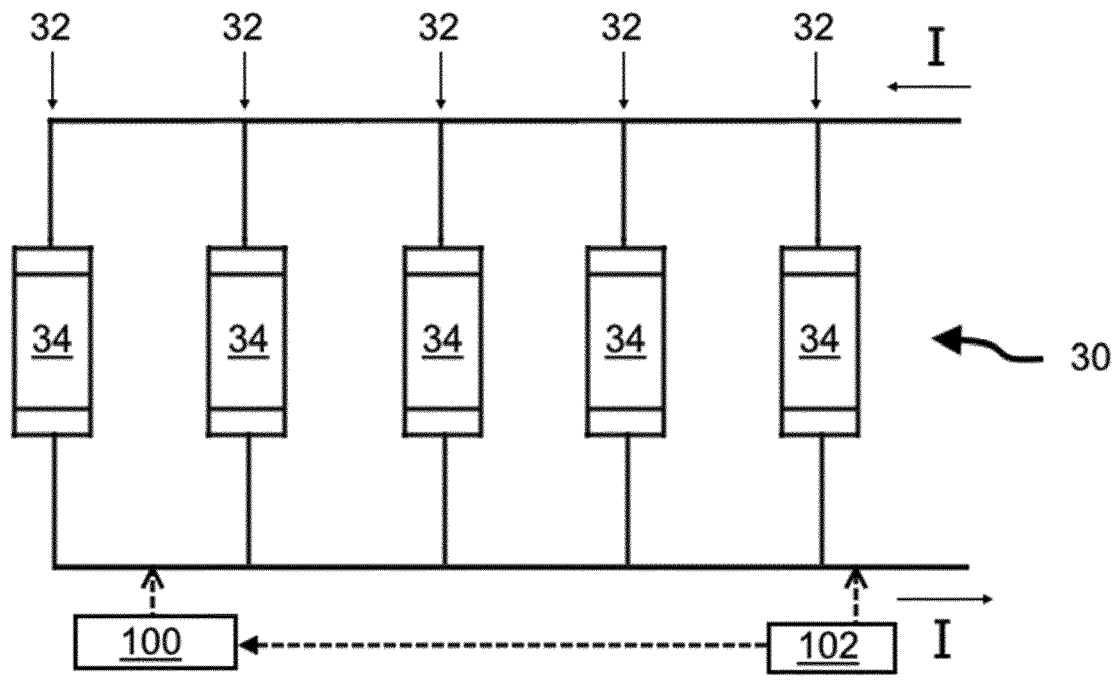
FIG. 4 shows schematically a switching apparatus according to an embodiment of the invention.

A switching apparatus according to an embodiment of the invention is shown in FIG. 4 and is designated generally by the reference numeral 30.

The switching apparatus 30 comprises a plurality of parallel-connected current-conductive branches 32. Each current-conductive branch 32 includes a respective gas tube switch 34. Each gas tube switch 34 includes a chamber enclosing an ionizable gas, and is configured to generate a plasma of ionized gas to facilitate a controlled current flow through the gas tube switch 34. In the embodiment shown, there are five current-conductive branches 32, but it will be appreciated that the number of current-conductive branches 32 of the switching apparatus 30 may vary.

The switching apparatus further includes a switching control unit 100 and a single current sensor 102.

The switching control unit 100 is configured to control the switching of the gas tube switches 34 over the course of a plurality of switching cycles. In particular, the switching control unit 100 is configured to control the turn-on of the gas tube switches 34 in a fixed sequential switching order so that the flow of current I in the switching apparatus 30 is controlled to sequentially switch between the current-conductive branches 32. The sequential switching order of the turn-on of the gas tube switches 34 is further arranged so that only one of the gas tube switches 34 is turned on during each turn-on cycle of the switching apparatus 30, which means that only one of the current-conductive branches 32 is carrying the current during each turn-on cycle of the switching apparatus 30. In other words, simultaneous flow in multiple current-conductive branches 32 during each turn-on cycle of the switching apparatus 30 is prevented.

The current sensor 102 (such as a Rogowski coil) is configured to monitor and measure the current I flowing in the entire switching apparatus 30 by measuring the current in the common current path extending from the parallel-connected current-conductive branches 32. The current sensor 102 is configured to be in communication with the switching control unit 100.

Figure 5:
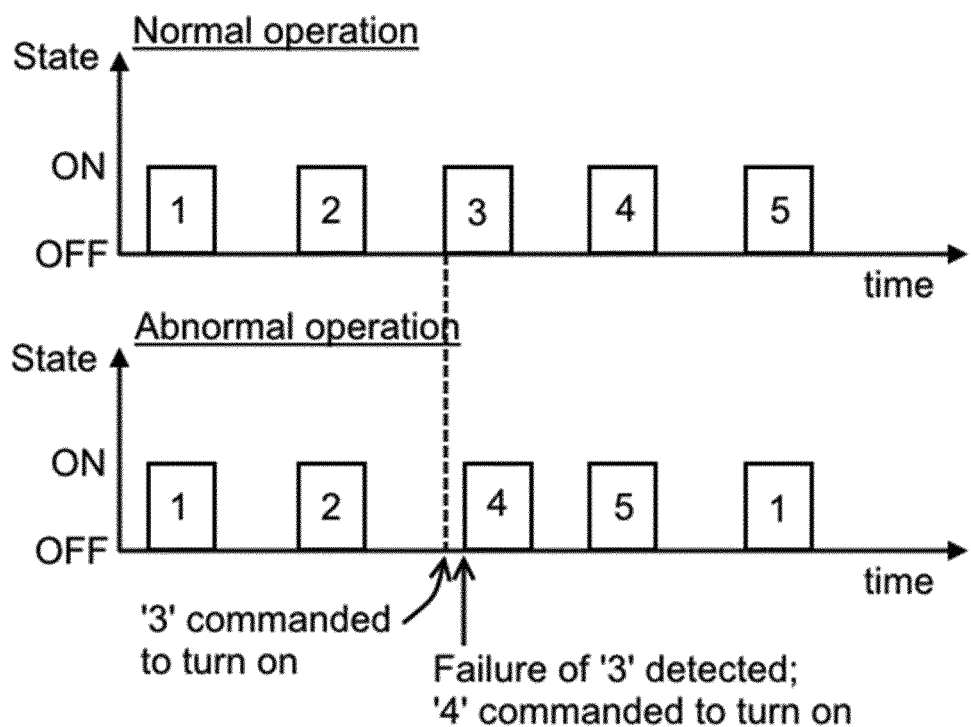
FIG. 5 illustrates a sequential switching order of a plurality of gas tube switches of the switching apparatus of FIG. 4.

FIG. 5 illustrates the sequential switching order of the gas tube switches 34 (which are indicated as '1', '2', '3', '4' and '5' respectively). Turning on the gas tube switches 34 in the sequential switching order results in one of the gas tube switches 34 being turned on in each turn-on cycle of the switching apparatus 30 while the remaining gas tube switches 34 are turned off. Hence, in each turn-on cycle of the switching apparatus 30, the current I flowing through the switching apparatus 30 flows through the current-conductive branch 32 in which the turned-on gas tube switch 34 is located, but does not flow through the remaining current-conductive branches 32 in which the turned-off gas tube switches are located.

During normal operation of the switching apparatus 30, the switching control unit 100 commands the gas tube switches 34 to turn on in the sequential switching order using a recurring sequence of turning on the gas tube switches 34 from '1' to '2' to '3' to '4' to '5' over the course of a plurality of switching cycles of the switching apparatus 30.

It will be appreciated that the fixed sequential switching order may be replaced by another fixed sequential switching order in which the turn-on of the gas tube switches 34 are ordered differently, e.g. using a recurring sequence of turning on the gas tube switches 34 from '5' to '4' to '3' to '2' to '1', or from '1' to '4' to '3' to '5' to '2'.

As mentioned above, turning on a plurality of parallel-connected gas tube switches 34 one at a time is advantageous over simultaneously turning on all of the gas tube switches 34, because the former switching approach results in lower losses than the latter switching approach as a result of the negative slope resistances of the gas tube switches 34, and because the configuration of gas tube switches 34 enables them to easily withstand the higher temperature ripple and peak temperatures.

The configuration of the switching control unit 100 to turn on the gas tube switches 34 in the sequential switching order also results in a reliable "gas tube switch"-based switching apparatus 30 with reduced losses, while at the same time obviates the requirement to control the sharing of current between the parallel-connected current-conductive branches 32.

A given gas tube switch 34 may fail to open circuit, thus resulting in abnormal operation of the switching apparatus 30. The abnormal operation of the switching apparatus 30 will be described with reference to the failure of the third gas tube switch '3', but it will be appreciated that the described abnormal operation of the switching apparatus 30 applies mutatis mutandis to the remaining gas tube switches '1', '2', '4' and '5'.

During abnormal operation of the switching apparatus 30, the switching control unit 100 commands the gas tube switches 34 to turn on in the sequential switching order from '1' to '2' to '3' to '4' to '5' so that only one of the gas tube switches 34 is turned on during each turn-on cycle of the switching apparatus 30. When the failed third gas tube switch '3' is commanded to turn on, the current sensor 102 detects the lack of current I flowing through the switching apparatus 30 and thus is able to detect the failure of the third gas tube switch '3'. Thereafter the current sensor 102 communicates this information to the switching control unit 100. In response to the detection of the failure of the third gas tube switch '3', the switching control unit 100 commands the fourth gas tube switch '4', which is next in the sequential switching order, to turn on in order to continue the operation of the switching apparatus 30.

After the sequence of turning on the gas tube switches 34 from '1' to '2' to '3' to '4' to '5' is completed, the switching control unit 100 again commands the gas tube switches 34 to turn on in the sequential switching order to repeat the sequence of turning on the gas tube switches 34 from '1' to '2' to '3' to '4' to '5'. In particular, when the third gas tube switch '3' is to be turned on again according to the sequential switching order, the switching control unit 100 again commands the third gas tube switch '3' to turn on. This is in case that the failure of the third gas tube switch '3' is temporary, in which case the switching apparatus 30 is able to revert to its normal switching operation, instead of skipping the turn-on of the third gas tube switch '3'. In the event of the permanent failure of the third gas tube switch '3', the switching control unit 100 would then continue to command the fourth gas tube switch '4', which is next in the sequential switching order, to turn on.

In this manner the reliability of the "gas tube switch"-based switching apparatus 30 is assured even during failure of a given gas tube switch 34.

Figure 6:
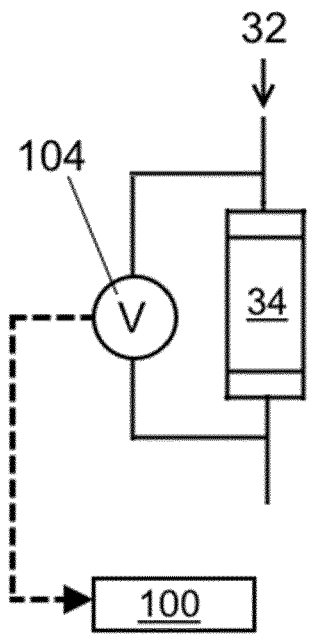
FIG. 6 shows schematically a voltage sensor configured to measure the voltage across a gas tube switch of the switching apparatus of FIG. 4.

Additionally or alternatively to the use of the current sensor 102, the detection of the failure of a gas tube switch 34 may be carried out using a plurality of voltage sensors 104, each of which is configured to measure the voltage across a respective gas tube switch 34 as shown in FIG. 6. The failure of a given gas tube switch 34 can be detected by checking whether the voltage across the gas tube switch 34 collapses to a low value (e.g. <500V) within a predefined time period (e.g. a few μs) after the turn-on command. If the voltage across the gas tube switch 34 collapses within the predefined time period, the gas tube switch 34 is successfully turned on. If the voltage across the gas tube switch 34 does not collapse, the gas tube switch 34 is detected as having failed.

It will be appreciated that the switching apparatus 30 may be configured to use other types of sensors to detect the failure of the gas tube switches 34.

The state of each gas tube switch 34 may vary during the operation of the switching apparatus 30. For example, the cathode temperature of one or more gas tube switches 34 may vary, which can be monitored using temperature sensors, or the condition of the plasma of ionized gas inside each gas tube switch 34 may vary, which can be monitored using a spectroscopic analyser. The variation in the state of each gas tube switch 34 may relate to its health, its ability to operate within safety limits, its switching performance, or a combination thereof.

The switching control unit 100 may be configured to be responsive to changes in the states of the gas tube switches 34, which under certain circumstances may be unpredictable. When the switching control unit 100 is configured as such, the switching apparatus 30 further includes a monitoring unit configured to monitor a respective parameter indicative of a respective state of each gas tube switch 34, and the switching control unit 100 is configured to arrange the switching order of the turn-on of the gas tube switches 34 in response to a deviation of at least one monitored parameter from a target value or range.

The configuration of the switching control unit 100 to be responsive to changes in the states of the gas tube switches 34 will be described with reference to changes in the cathode temperatures of the gas tube switches 34, but it will be appreciated that the described configuration of the switching control unit 100 to be responsive to changes in the states of the gas tube switches 34 applies mutatis mutandis to other parameters indicative of the states of the gas tube switches 34.

Figure 7:
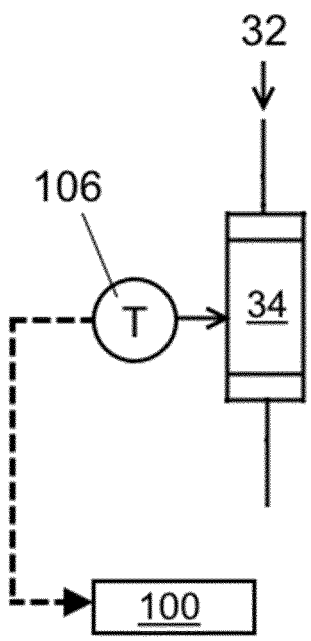
FIG. 7 shows schematically a temperature sensor configured to measure the cathode temperature of a gas tube switch of the switching apparatus of FIG. 4.

The switching apparatus 30 further includes temperature sensors (not shown) configured to continuously monitor the respective cathode temperatures of the gas tube switches 34 so as to detect changes in the cathode temperatures of the gas tube switches 34. FIG. 7 shows schematically a temperature sensor 106 configured as such. The temperature sensors 106 are configured to communicate the measured cathode temperature information to the switching control unit 100.

Initially the switching control unit 100 controls the turn-on of the gas tube switches 34 using the aforementioned fixed sequential switching order (or a random switching order) when the cathode temperatures of the gas tube switches 34 are balanced (or substantially balanced). However, when the cathode temperatures of the gas tube switches 34 become imbalanced such that the cathode temperature of one or more gas tube switches 34 is higher than the cathode temperature of one or more other gas tube switches, the switching control unit 100 arranges the switching order of the turn-on of the gas tube switches 34 to compensate for the higher cathode temperature(s) as follows.

In the event of the imbalance between the cathode temperatures of the gas tube switches 34, the measured cathode temperature information includes the detected deviation of the cathode temperatures of multiple gas tube switches from a target value, which in this case is the mean value of the respective cathode temperatures of the gas tube switches 34. Alternatively the target value may be replaced by a target range that extends between predefined tolerance limits of the mean value of the respective cathode temperatures of the gas tube switches 34.

In response to the detected deviation of the cathode temperatures of multiple gas tube switches 34 from the target value, the switching control unit 100 then arranges the switching order of the turn-on of the gas tube switches 34 to adjust a duty cycle of one or more of the gas tube switches 34 in the switching order. More specifically, the switching order is arranged to increase the turn-on frequency of the or each gas tube switch 34 with a cooler cathode temperature (thus increasing the duty cycle of the or each such gas tube switch 34 in the switching order), and to decrease the turn-on frequency of the or each gas tube switch 34 with a hotter cathode temperature (thus decreasing the duty cycle of the or each such gas tube switch 34 in the switching order). This allows the gas tube switch(es) 34 with the hotter cathodes (or as the case maybe, the hottest cathode) to cool down, while the current I flowing through the switching apparatus 30 flows through the gas tube switch 34 with the cooler cathode (or as the case maybe, the coolest cathode).

In the event that the deviation of the cathode temperature of a given gas tube switch 34 from the target value exceeds a predefined temperature threshold, the turn-on of the given gas tube switch 34 can be excluded from the switching order. The predefined temperature threshold may be set according to ensure the health of the gas tube switches 34 or to stay within safety limits.

In this manner the switching control unit 100 is configured to arrange a quasi-random switching order of the turn-on of the gas tube switches 34 that is responsive to changes in the states of the gas tube switches 34.

The invention claimed is:

1. A switching apparatus comprising:
a plurality of parallel-connected current-conductive branches each current-conductive branch including at least one respective gas tube switch;
a switching control unit configured to control the turn-on of the gas tube switches in a switching order so that the flow of current in the switching apparatus is controlled to switch between the current-conductive branches, wherein the switching order of the turn-on of the gas tube switches is arranged so that only one of the current-conductive branches is carrying the current during each turn-on cycle of the switching apparatus; and
a monitoring unit configured to monitor a respective parameter indicative of a respective state of each gas tube switch, wherein the switching control unit is configured to arrange the switching order of the turn-on of the gas tube switches in response to a deviation of at least one monitored parameter from a target value or range.

2. The switching apparatus according to claim 1 wherein the switching order is any one of:
a fixed switching order;
a fixed sequential switching order;
a variable switching order;
a random switching order; or
a quasi-random switching order.

3. The switching apparatus according to claim 1 wherein the switching control unit is configured to arrange the switching order of the turn-on of the gas tube switches to adjust a duty cycle of at least one gas tube switch in the switching order in response to a deviation of the or each corresponding monitored parameter from a target value or range.

4. The switching apparatus according to claim 1 wherein the target value is the mean value of the respective parameters of the gas tube switches, or the target range extends between predefined tolerance limits of the mean value of the respective parameters of the gas tube switches.

5. The switching apparatus according to claim 1 wherein the switching control unit is configured to arrange the switching order of the turn-on of the gas tube switches so that, when the deviation of the at least one monitored parameter from the target value or range exceeds a predefined threshold, the turn-on of the or each corresponding gas tube switch is excluded from the switching order.

6. The switching apparatus according to claim 1 further comprising: a detection unit configured to detect whether each gas tube switch has failed, wherein the switching control unit is configured to control the turn-on of the gas tube switches in the switching order so that, in response to the detection of a failure of a given gas tube switch that was commanded to turn on by the switching control unit, the switching control unit commands the next gas tube switch in the switching order to turn on.

7. The switching apparatus according to claim 6 wherein the switching control unit is configured to control the turn-on of the gas tube switches in the switching order so that, in response to the detection of a failure of a given gas tube switch that was commanded to turn on by the switching control unit, the switching control unit commands the given gas tube switch to turn on when the given gas tube switch is required to be turned on again according to the switching order.

8. The switching apparatus according to claim 6 wherein the detection unit comprises: a current detection sub-unit including at least one current sensor; and/or a voltage detection sub-unit including at least one voltage sensor.

9. The switching apparatus according to claim 8 wherein the current detection sub-unit comprises a single current sensor to measure the current (I) flowing through the switching apparatus.

10. The switching apparatus according to claim 1 wherein the switching apparatus is configured to have a current rating suitable for a high voltage direct current application.

11. A method of operating a switching apparatus, the switching apparatus comprising: a plurality of parallel-connected current-conductive branches, each current-conductive branch including at least one respective gas tube switch, wherein the method comprises:

controlling the turn-on of the gas tube switches in a switching order so that the flow of current in the switching apparatus is controlled to switch between the current-conductive branches;

arranging the switching order of the turn-on of the gas tube switches so that only one of the current-conductive branches is carrying the current during each turn-on cycle of the switching apparatus;

monitoring a respective parameter indicative of a respective state of each gas tube switch; and arranging the switching order of the turn-on of the gas tube switches in response to a deviation of at least one monitored parameter from a target value or range.

12. The method of operating a switching apparatus according to claim 11 wherein the switching order is any one of:

a fixed switching order;
a fixed sequential switching order;
a variable switching order;
a random switching order; or
a quasi-random switching order.

13. The method according to claim 11 wherein the switching apparatus is configured to have a current rating suitable for a high voltage direct current application.

* * * * *